G. W. DICKEY.
MANIFOLDING SHEETS.
APPLICATION FILED JUNE 25, 1909.

998,078.

Patented July 18, 1911.

2 SHEETS—SHEET 1.

FIG. 1.

WITNESSES
A. T. Palmer
R. B. Ellms

INVENTOR
GEORGE W. DICKEY
BY Ellis Spear Jr.
ATTY.

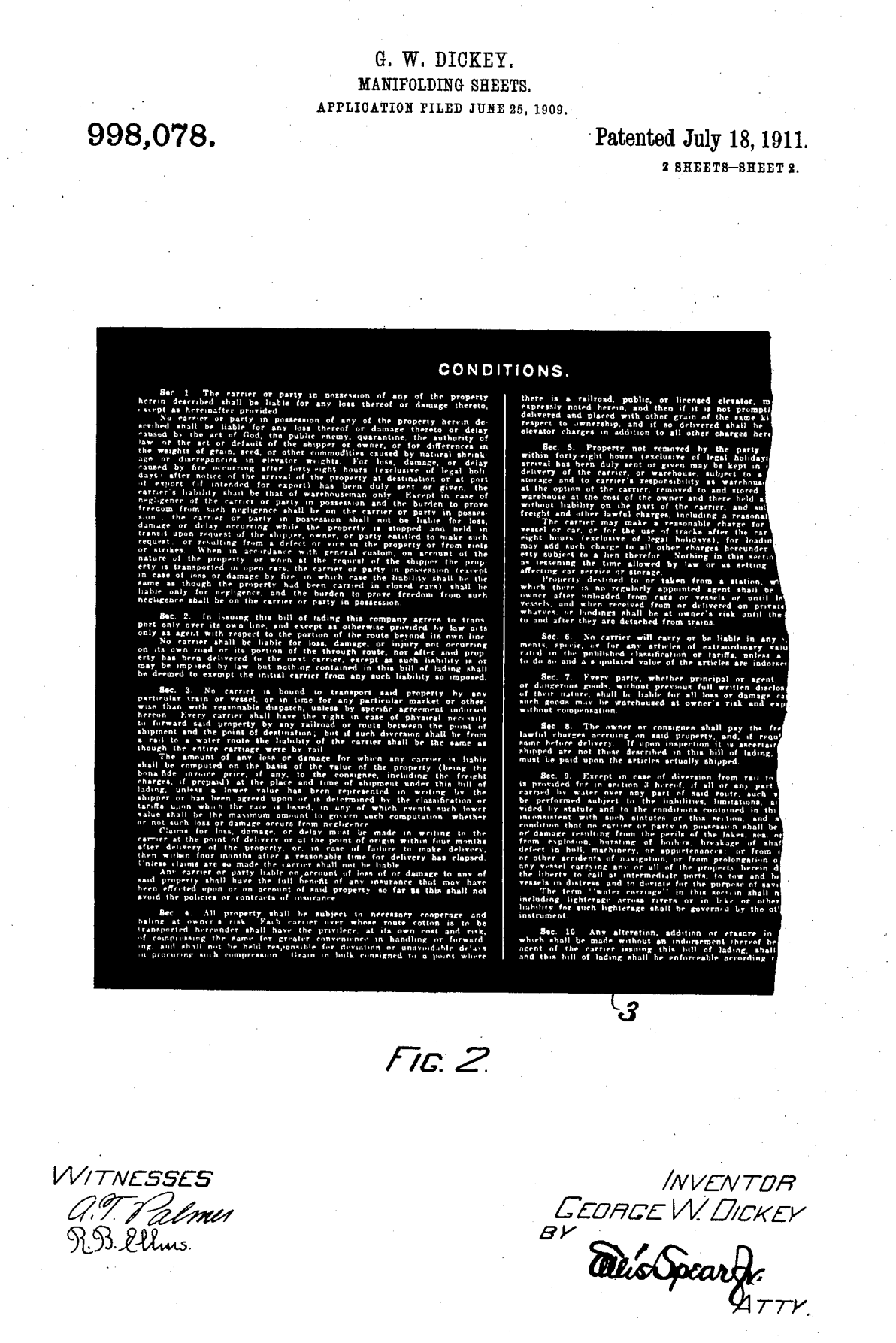

G. W. DICKEY.
MANIFOLDING SHEETS.
APPLICATION FILED JUNE 25, 1909.

998,078.

Patented July 18, 1911.

2 SHEETS—SHEET 2.

FIG. 2.

WITNESSES
G. T. Palmer
R. B. Ellms.

INVENTOR
GEORGE W. DICKEY
BY
Alis Spear Jr.
ATTY.

UNITED STATES PATENT OFFICE.

GEORGE W. DICKEY, OF PORTLAND, MAINE, ASSIGNOR OF ONE-HALF TO GEORGE W. DICKEY, OF PORTLAND, MAINE, AND ONE-HALF TO ELLIS SPEAR, JR., OF BOSTON, MASSACHUSETTS.

MANIFOLDING-SHEETS.

998,078. Specification of Letters Patent. Patented July 18, 1911.

Application filed June 25, 1909. Serial No. 504,222.

*To all whom it may concern:*

Be it known that I, GEORGE W. DICKEY, a citizen of the United States, residing at Portland, county of Cumberland, State of Maine, have invented certain new and useful Improvements in Manifolding-Sheets, of which the following is a specification.

The invention relates to multiple-copy sheets and particularly to two-sided copying-form sets in which the separate carbon sheet is dispensed with. These sets consist of sheets partly printed on their face, so as to furnish a form to be filled in, and with conditions or other text matters on the reverse side. In using, they are arranged so that with the one writing or filling in of the top sheet, a copy is made at the same time on all of the other sheets in the set, without the use of a separate carbon or transfer paper sheet.

In duplicate and triplicate bills of lading, and many other sets of printed forms in which a number of copies are required, it is necessary that the back of the sheet be employed for the statement of conditions under which the form is filled, or for other text matter. This has made it necessary, heretofore, to use separate carbon sheets interposed between the forms for the transmission of the filling thereof. The employment of separate carbon sheets obviously entails great annoyance, delay and expense. Aside from the cost of separate carbon or transfer paper sheets, the necessity of inserting them between the individual sheets, comprising the set of forms, is one which involves a considerable amount of labor and a great loss of time, especially where the number of copies required runs up, as it often does, to ten or more copies.

To the end, therefore, of providing for a form with a copying or transfer coating on the back thereof, and at the same time permitting the back to be used for the text of conditions or other matter desired, I have devised my present invention in which I have discovered that the text desired on the back of the form may be intagliated, leaving the lettering of the conditions or other matter uncoated, and hence legible.

My invention will be more fully described in the specification which follows, and as illustrative thereof I have shown in the accompanying drawings and described in the specification as an illustrative embodiment thereof a bill of lading in triplicate constructed in accordance with my invention.

Throughout specification and drawings like reference letters indicate corresponding parts and in the drawings:—

Figure 1 is a view of a set of blanks superimposed but slightly separated with corners turned up, and Fig. 2 is a general view of an intagliated backing showing the text.

1 are a plurality of billing blanks having on the face 2 a regular form for such a bill. These bills are usually prepared in series comprising sometimes an original bill of lading, a shipping order and a memorandum. These bills have the same general forms, with slight verbal modifications, additions and omissions to provide for the different usages to which they are to be put. On the back of each, however, it is desired to have the full text of the conditions under which the transaction is to take place. In order to secure the multiple copies, I, therefore, provide each sheet, excepting the last one, with a copying or transfer carbon 3 in which there is intagliated in a fine text 4 the conditions of the transaction. These conditions, therefore, appear in a wording, the letters of which are uncoated and read as a light text on a dark background. The text 4 should be of such a size, compared with ordinary hand writing, that any letter formed in writing would cross more carbon surface than it would spaces formed by the intaglio of the letters which lie in the path of the writing. The word "fine" is to be understood in this application as meaning substantially that fineness which has just been described.

Various modifications of form may, of course, be used, and a great variety of numbers of copies may be produced. The intagliated text may also of course relate to matters other than conditions. I find that in filling in these forms the writing is clearly transmitted from copy to copy through the intagliated backing.

Various other modifications may obviously be made within the limits of the appended claims without departing from the spirit of my invention.

What I therefore claim and desire to secure by Letters Patent is:—

1. In a multiple copy form system, a plurality of sheets adapted to be superimposed for filling in, one of said sheets having on its face a form and on its back a copying or transfer coating and a fine text intagliated and uncoated in said coating and underlying the form to be filled in.

2. In a billing system, a plurality of sheets comprising a billing set and adapted to be superimposed for filling in, each sheet having on its face a standard form and on its back a copying or transfer coating and an uncoated condition text in fine characters intagliated in said coating and underlying the form to be filled in on the face of the sheet.

3. An article of the class described, comprising a sheet having on its face a fill-in form, a copying or transfer-coated surface on the back of the sheet and an uncoated fine text intagliated in said coating and underlying said form.

4. In a multiple copy system, a pair of sheets having a common fill-in form on their face and adapted to be superimposed for filling in, the upper sheet having on its back a copying or transfer coating and an uncoated fine text intagliated in said coating and underlying said form on the face of the sheet.

In testimony whereof, I affix my signature in presence of two witnesses.

GEORGE W. DICKEY.

Witnesses:
F. L. R. GOULD,
ASA L. JACOBS.

---

Copies of this patent may be obtained for five cents each, by addressing the "Commissioner of Patents, Washington, D. C."